United States Patent
Ryan et al.

(10) Patent No.: US 10,512,256 B2
(45) Date of Patent: Dec. 24, 2019

(54) CARPENTER BEE TRAP

(71) Applicant: Best Bee Brothers LLC, Milwaukee, WI (US)

(72) Inventors: Paul Patrick Ryan, Elm Grove, WI (US); Michael James Ryan, Wauwatosa, WI (US)

(73) Assignee: Best Bee Brothers LLC, Milwaukee, WI (US)

( * ) Notice: Subject to any disclaimer, the term of this patent is extended or adjusted under 35 U.S.C. 154(b) by 196 days.

(21) Appl. No.: 15/830,193

(22) Filed: Dec. 4, 2017

(65) Prior Publication Data

US 2019/0166820 A1  Jun. 6, 2019

(51) Int. Cl.
*A01M 1/10* (2006.01)
*A01M 1/02* (2006.01)
*A01M 1/24* (2006.01)

(52) U.S. Cl.
CPC .............. *A01M 1/106* (2013.01); *A01M 1/02* (2013.01); *A01M 1/24* (2013.01)

(58) Field of Classification Search
CPC ........... A01M 1/10; A01M 1/106; A01M 1/20
See application file for complete search history.

(56) References Cited

U.S. PATENT DOCUMENTS

| | | |
|---|---|---|
| 5,682,706 A | 11/1997 | Altenburg |
| 6,766,611 B2 | 7/2004 | Prince |
| 7,472,511 B1 | 1/2009 | Ng |
| 8,375,624 B2 | 2/2013 | Blazer |
| RE46,421 E * | 6/2017 | Blazer .................... A01M 1/106 |
| 2010/0139151 A1* | 6/2010 | Cwiklinski ............. A01M 1/02 43/107 |
| 2013/0298444 A1* | 11/2013 | Strube ................... A01M 1/145 43/113 |

* cited by examiner

*Primary Examiner* — Richard G Davis
(74) *Attorney, Agent, or Firm* — Boyle Fredrickson, S.C

(57) ABSTRACT

A carpenter bee trap includes a plurality of walls surrounding a trap cavity, at least one entrance opening formed through at least one of the plurality of walls, a bottom wall coupled to a bottom of the plurality of walls, an exit opening formed through the bottom wall, a container disposed within the trap cavity and extending through the exit opening and beyond a bottom of the trap, and a funnel disposed within the cavity to direct carpenter bees into the container.

20 Claims, 14 Drawing Sheets

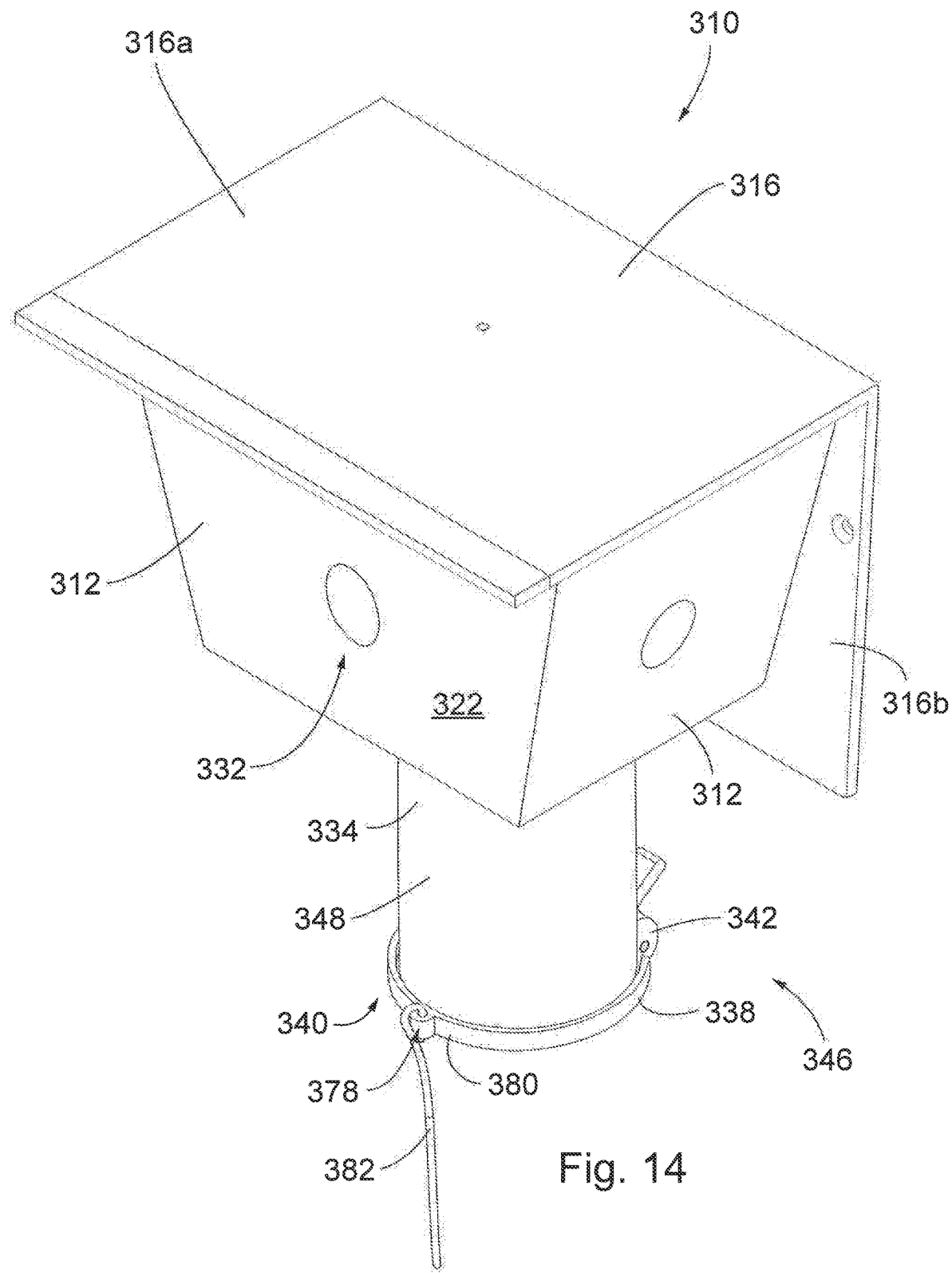

CARPENTER BEE TRAP

BACKGROUND OF THE INVENTION

1. Field of the Invention

The present invention relates to a carpenter bee traps, and more specifically to carpenter bee traps having containers suspended from the inside of the trap and having a release door at the bottom of the container.

2. Discussion of the Related Art

Carpenter bees tend to bore into wood structures for nesting. Over time, carpenter bees may continue to bore new tunnels deeper into the wood structure. As a result of the boring described above, carpenter bees have a tendency to damage wooden structures to create their nests. The damaged wooden structures are then weakened and left defaced.

Carpenter bee traps have been used to entrap carpenter bees and leave them to die in a container of the trap. Such traps may be placed anywhere in or around a wooden structure, for example, but not limited to, the rafters and eaves of a wooden structure. By being made of wood or a wood substitute, the carpenter bee traps attract the carpenter bees. The carpenter bees are then able to enter the trap through openings mimicking boring tunnels. In some carpenter bee traps known in the art, a receptacle, such as a milk carton or soda bottle, is removable coupled to the bottom of the trap by way of a receptacle adapter. A user then needs to approach the carpenter bee trap to be able to remove the receptacle once filled with dead bees. In some instances, the user would need to climb a ladder to approach carpenter bee traps disposed in the rafters and eaves of a wooden structure.

As a result, there is a need in the art for a carpenter bee trap having a door disposed at the bottom of the trap container. The door would be able to be manipulated by a user from a closed position to an open position from a great distance. In turn, the door may also include a biasing element to maintain the door in the closed position when not being manipulated by the user. The door may also include perforations to allow airflow between the trap container and the external environment. The airflow would provide the scent and sound of carpenter bees to the external environment, which would act as a further attractant. Other benefits include moisture not being trapped inside trap container.

There also is a need for a carpenter bee trap to include a funnel feature in the trap cavity to direct the bees more efficiently to the trap container. Such a funnel would provide an additional measure to prevent bees from escaping the cavity of the trap.

SUMMARY OF THE INVENTION

A carpenter bee trap having a container suspended from the inside of the trap and a release door disposed at the bottom of the container.

In accordance with an embodiment of the invention, a carpenter bee trap includes a plurality of walls surrounding a trap cavity, at least one entrance opening formed through at least one of the plurality of walls, a bottom wall coupled to a bottom of the plurality of walls, an exit opening formed through the bottom wall, a container disposed within the trap cavity and extending through the exit opening and beyond a bottom of the trap, and a funnel disposed within the cavity to direct carpenter bees into the container.

According to another aspect of the invention, a door is rotatably connected to the bottom of the container by way of a hinge. The door is operable between a closed position and an open position. The hinge may include a biasing element to bias the door to a closed position. Further, the door may include a plurality of perforations to allow airflow between the container and an external environment.

According to yet another aspect of the invention, the container includes a main body and a flanged portion extending upward from a top of the main body at an angle between 0 and 90 degrees. The flanged portion has an increasing diameter as it extends from the top of the main body. In addition, the flanged portion is disposed with the cavity, while the main body is disposed within the exit opening and extends away from and beyond the bottom of the trap. The funnel may extend from a top of the flanged portion to an opening aligned with the top of the main body.

According to other aspects of the invention, the funnel may be suspended within the cavity. The funnel may include flanges configured to push against an inner surface of at least one sidewall to suspend the funnel within the cavity.

In accordance with another embodiment of the invention, a carpenter bee trap includes a plurality of walls surrounding a trap cavity, at least one entrance opening formed through at least one of the plurality of walls, an exit opening formed at a bottom of the trap, a container disposed within the trap cavity and extending through the exit opening and beyond the bottom of the trap, the container including a main portion and a flanged portion, and a door rotatably coupled to a bottom of the container by way of a hinge.

According to other aspects of the invention, the flanged portion extends from a top of the main portion at an angle to increase a width of the flanged portion beyond a width of the exit opening. The flanged portion extends along an inner surface of at least one wall at an angle equal to an angle of the at least one wall.

According to yet another aspect of the invention, the flanged portion may include a funnel extending from a top of the flanged portion to a bottom of the flanged portion. The funnel forms a container opening at the bottom of the flanged portion.

According to another aspect of the invention, the hinge includes a biasing element to bias the door to a closed position. In addition, the door may include a plurality of perforations to allow airflow between the container and an external environment. A pulling device may also be coupled to the door. The pulling device would allow a user to transition the door from a closed position to an open position from a distance.

In accordance with yet another embodiment of the invention, a carpenter bee trap includes a plurality of sidewalls surrounding a trap cavity, at least one entrance opening formed through at least one of the plurality of sidewalls, a bottom wall coupled to the bottom of the plurality of sidewalls, an exit opening formed through the bottom wall, a funnel suspended within the trap cavity, and a container disposed within the trap cavity and extending through the exit opening and away from the bottom wall of the trap. The funnel separates the trap cavity into an upper trap cavity and a lower trap cavity, and the container is disposed within the lower trap cavity.

According to another aspect of the invention, the container includes a main body, a flanged portion extending from a top of the main body, and a bottom wall coupled to a bottom of the main body. The flanged portion is disposed within the cavity, while the main body extends through the exit opening and beyond the bottom wall of the carpenter bee trap.

According to yet another aspect of the invention, the flanged portion has a first outer diameter and the main body has a second outer diameter. The first outer diameter is greater than the second outer diameter. Further, the first outer diameter of the flanged portion is greater than a diameter of the exit opening.

According to another aspect of the invention, the funnel includes at least one flange configured to push against an inner surface of at least one sidewall to suspend the funnel within the cavity.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications. Further, although many methods and materials similar or equivalent to those described herein may be used in the practice of the present invention, a few such suitable methods and materials are described in greater detail below.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which:

FIG. 14 is a perspective view of a carpenter bee trap, according to another embodiment of the invention.

Figure 1:
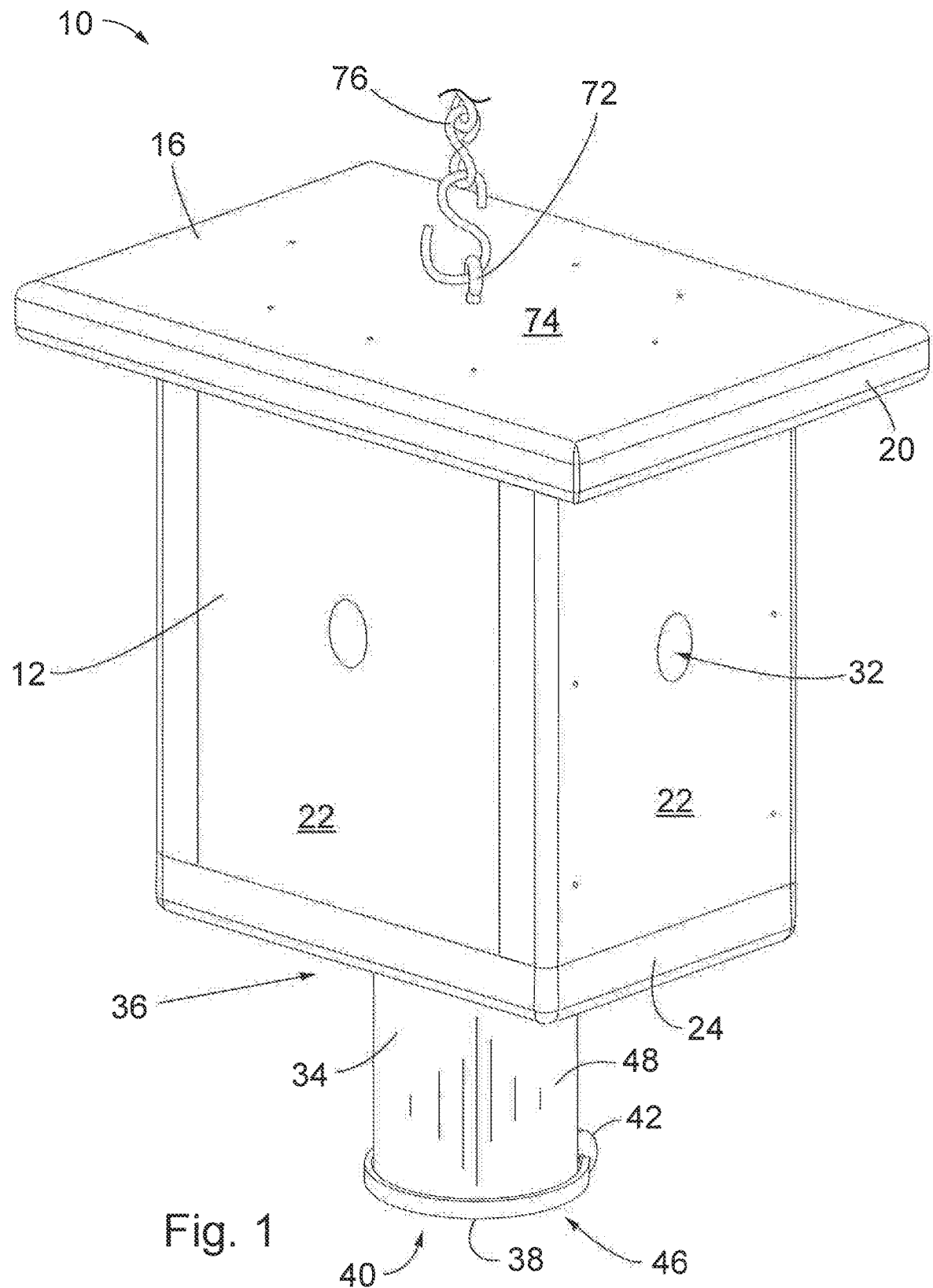
FIG. 1 is a perspective view of a carpenter bee trap, according to an embodiment of the invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION OF THE DRAWINGS

The present invention and the various features and advantageous details thereof are explained more fully with reference to the non-limiting embodiments described in detail in the following description.

Figure 2:
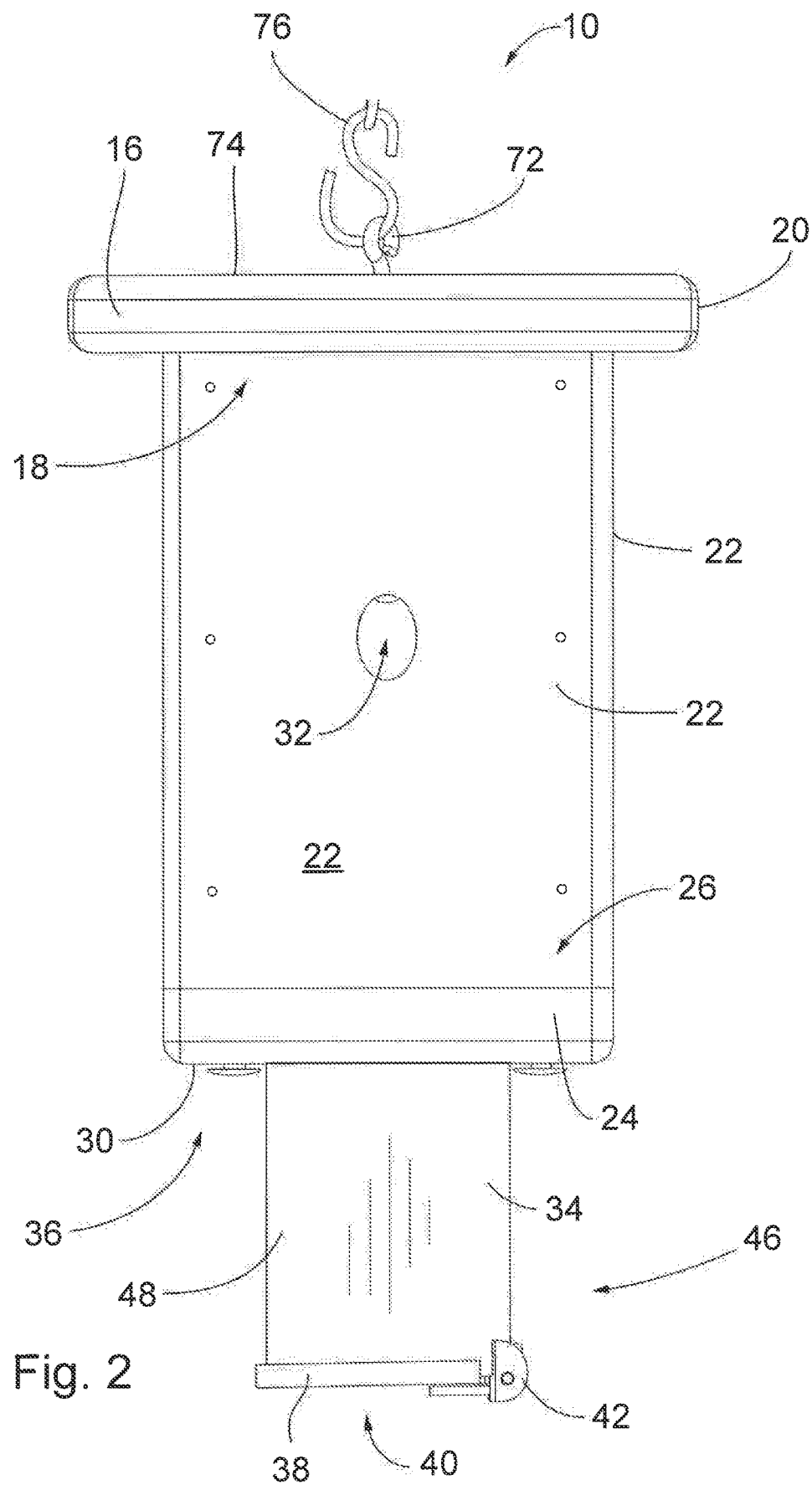
FIG. 2 is a side view of the carpenter bee trap of FIG. 1.
Figure 3:
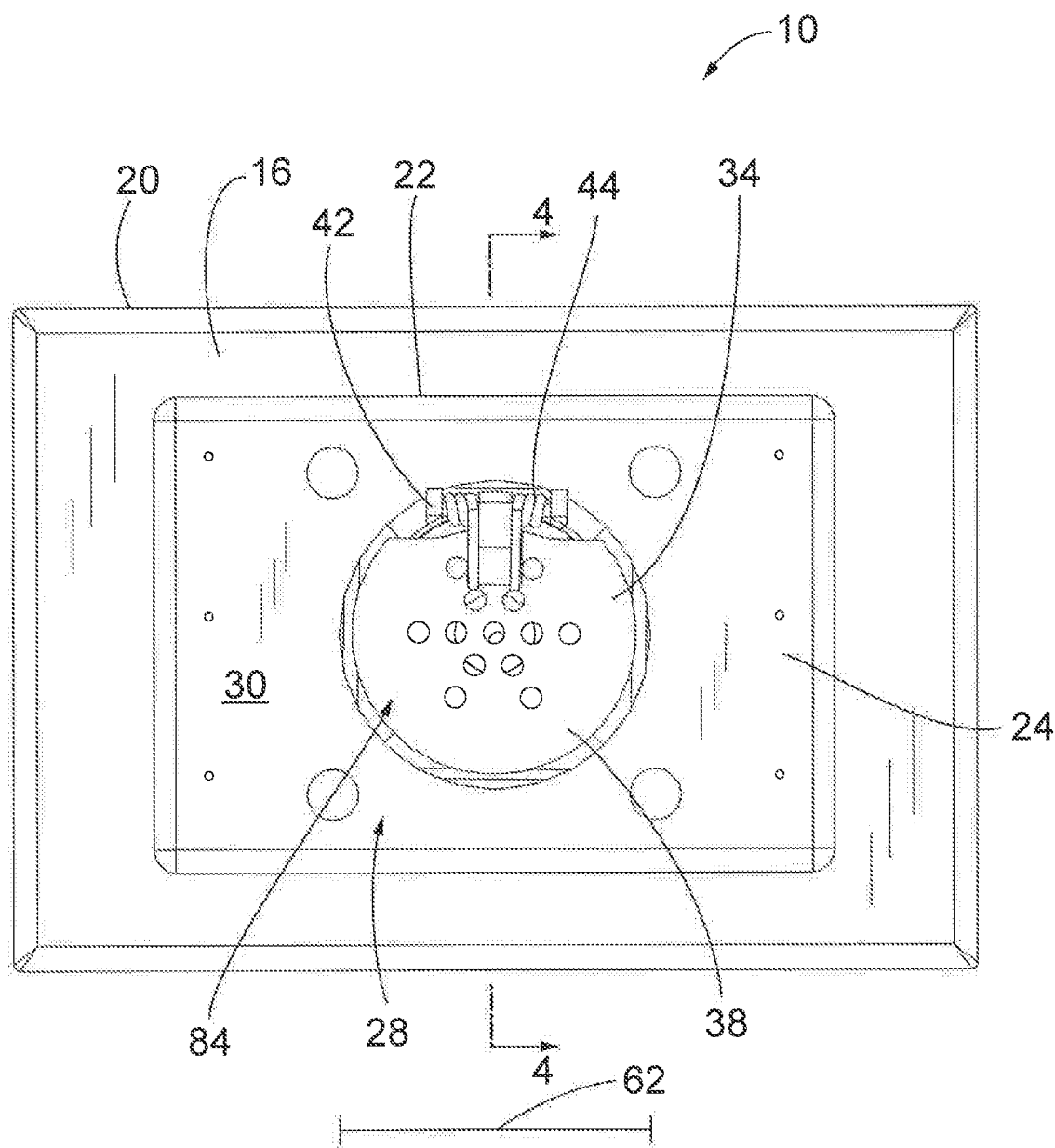
FIG. 3 is a bottom view of the carpenter bee trap of FIG. 1.

First referring to FIGS. 1-3, perspective, side, and bottom views, respectively, of a carpenter bee trap 10 are shown. The trap 10 includes a plurality of sidewalls 12 surrounding a trap cavity 14. While the representative embodiment of the invention illustrates the use of four (4) sidewalls 12, it is contemplated that other embodiments of the invention may include more or less than four (4) sidewalls. Further, while the trap 10 is illustrated as being rectangular in shape, different embodiments of the trap 10 may vary in shape.

The trap 10 further includes a top wall 16 attached to the top 18 of the plurality of walls 12, in order to further enclose the cavity 14. While FIG. 1 illustrates the edges 20 of the top wall 16 extending beyond the plurality of sidewalls 12, it is contemplated that the edges 20 of the top wall 16 may align with the outer surface 22 of the plurality of sidewalls 12, in alternative embodiments of the invention.

In this representative embodiment of the invention, the trap 10 also includes a bottom wall 24 coupled to the bottom 26 of the plurality of walls 12, in order to further enclose the cavity 14. As shown in FIG. 3, an opening 28 may be formed through the bottom wall 24 of the trap 10. While the opening 28 is illustrated as being centrally located on the bottom surface 30 of the bottom wall 24, it may be located at any location on the bottom surface 30 of the bottom wall 24. Opening 28 operates as an exit for the trap cavity 14.

At least one opening 32 is formed through at least one of the plurality of sidewalls 12 to act as an entrance to the trap 10. It is contemplated that the carpenter bees will enter the trap 10 through these openings 32. While FIGS. 1 depicts an opening 32 in each sidewall 12, it is contemplated that any number of openings 32 may be formed through any number of sidewalls 12. For instance, each sidewall 12 may individually include any number of openings 32, including no openings 32. The configuration of the openings 32 will be further described below with respect to FIG. 4.

While FIG. 1 illustrates the sidewalls 14 as being oriented perpendicular to the top wall 16 and perpendicular to the bottom wall 24, it is contemplated that the sidewalls 14 may be oriented at varying angles.

A container 34 is disposed at the bottom 36 of the trap 10, so as to extend from within the cavity 14, through the opening 28, and out into the external environment. Once the bees enter the trap 10 through the openings 32 described above, the bees transition to the container 34 and become caught in the container 34, where they can collect. As shown in FIGS. 1 and 2, the container 34 includes a door 38 disposed at the bottom 40 of the container 34. The door 38 is rotatably coupled to the bottom 40 of the container 34 by way of a hinge 42. In the representative embodiment of the invention, the hinge 42 includes a biasing element 44 that maintains the door 38 in a closed position 46, as shown in FIGS. 1 and 2. In turn, a user may manipulate the door 38 from the closed position 46 to an open position (not shown). In the closed position 46 shown in FIGS. 1 and 2, the bees may collect within the container 34, as mentioned above. In the open position, the bees may be emptied from the container 34 at a moment determined by the user. In embodiments of the invention including the biasing element 44, the door 38 automatically transitions from the open position to the closed position 46 when the user releases the door 38.

In other embodiments of the invention, the hinge 42 may not include a biasing element 44. In these embodiments of the invention, a retaining device, such as, but not limited to a clip, may be used to retain the door 38 in the closed position 46. That is, a user would be able to release the door 38 from the retaining device, open the door 38 to empty the trap 10, close the door 38, and retain the door 38 in the closed position 46 by way of the retaining device.

Figure 4:
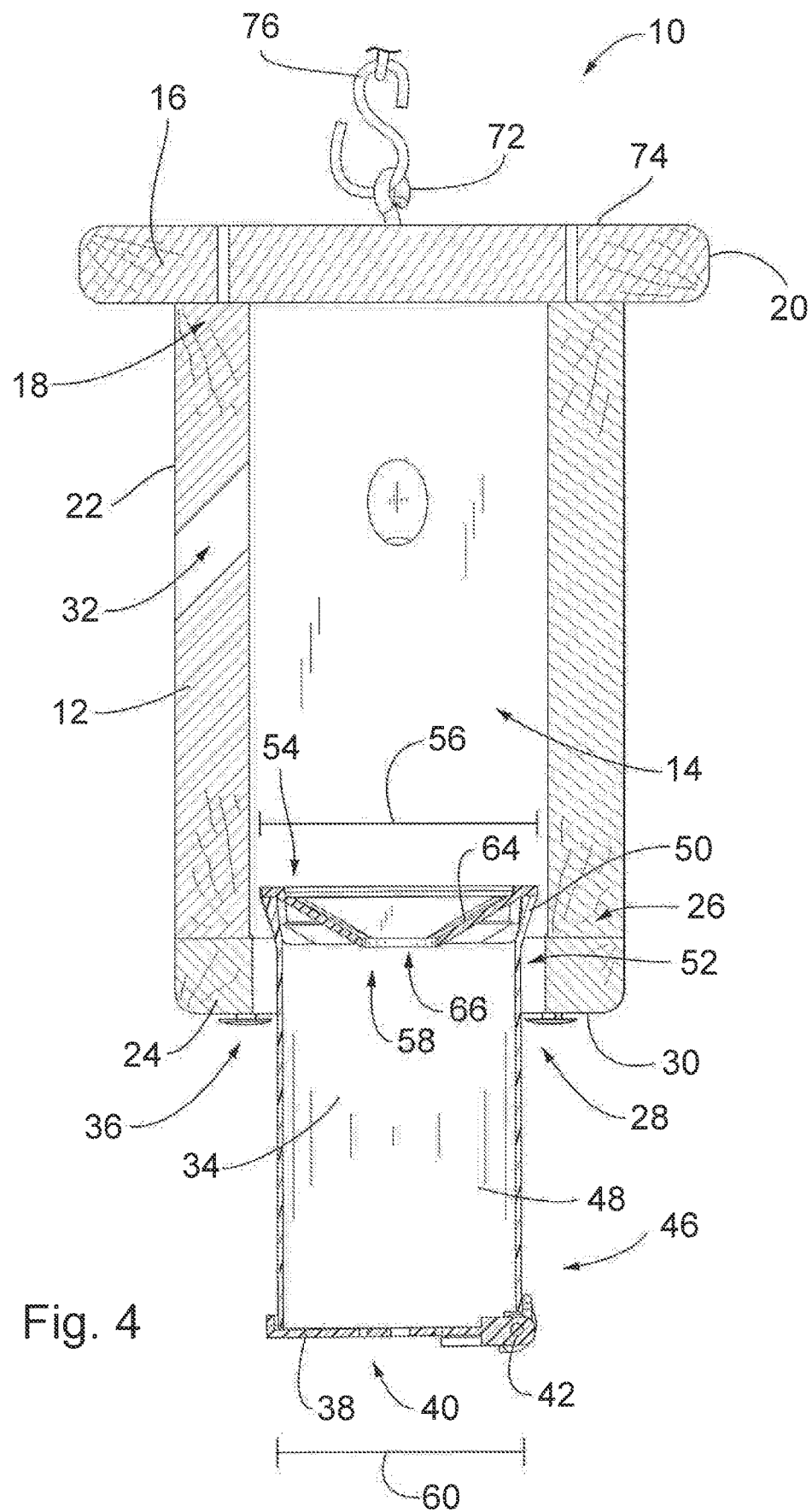
FIG. 4 is a cross-sectional view of the carpenter bee trap of FIG. 3, taken along line 4-4.

Next, FIG. 4 illustrates a cross-sectional view of the trap 10 in order to further illustrate the cavity 14 of the trap and the container 34 extending from within the cavity 14, through the opening 28, and out into the external environment. In the representative embodiment of the invention, the container 34 includes a main body 48 that is cylindrical in shape. In varying embodiments of the invention, the main body 48 of the container 34 may be any other shape. It is the main body 48 of the container 34 that extends through the opening 28 and into the external environment. The container 34 also includes a flanged portion 50 extending from the top 52 of the main body 48 of the container 34.

The flanged portion 50 extends from the top 52 of the main body 48 at an angle between 0 and 90 degrees so that the top 54 of the flanged portion 50 has a diameter 56, while the bottom 58 of the flanged portion 50 has a diameter 60. As shown in the representative embodiment of the invention, the diameter 56 of the top 54 of the flanged portion 50 is greater than the diameter 60 of the bottom 58 of the flanged portion 50.

In addition, the diameter 56 of the top 54 of the flanged portion 50 is greater than a diameter 62 of the opening 28 formed in the bottom wall 24 of the trap 10. As a result, of the increasing diameter from the bottom 58 to the top 54 of the flanged portion 50, the flanged portion 50 of the container 34 is maintained within the cavity 14 of the trap 10. In addition, the container 34 is suspended in its position of having the flanged portion 50 disposed within the cavity 14 and the main body 48 extending through the opening 28 of the bottom wall 24 of the trap 10 and beyond the bottom wall 24 of the trap 10, into the external environment.

The container 34 also includes a funnel 64 to direct the carpenter bees to the main body 48 of the container 34. The funnel 64 extends from the top 54 of the flanged portion 50 to a container opening 66 aligned with the bottom 58 of the flanged portion 50 and the top 52 of the main body 48. In the representative embodiment of the invention, the funnel 64 extends from the top 54 of the flanged portion 50 at an angle between 0 and 90 degrees so as to properly direct the bees to the main body 48 of the container 34.

FIG. 4 also illustrates the configuration of openings 32 in the sidewalls 12. For example, the openings 32 in the sidewalls 12 are oriented at an upward angle, which assists in preventing the bees from escaping the trap cavity 14. In other embodiments of the invention, the openings 32 may be oriented at any angle, including horizontally, upward, or downward.

Referring again to FIGS. 1 and 2, a mounting element 72 is shown disposed on a top surface 74 of the top wall 16. In the representative embodiment of the invention, the mounting element 72 is a mounting hook screwed into the top wall 16 of the trap 10. In other embodiments of the invention, the mounting element 72 may be other mounting means coupled to the top wall 16 of the trap 10. A chain or rope 76 is then coupled to the mounting element 72 in order to suspend the trap 10 from a mounting location, such as, but not limited to a rafter.

Figure 5:
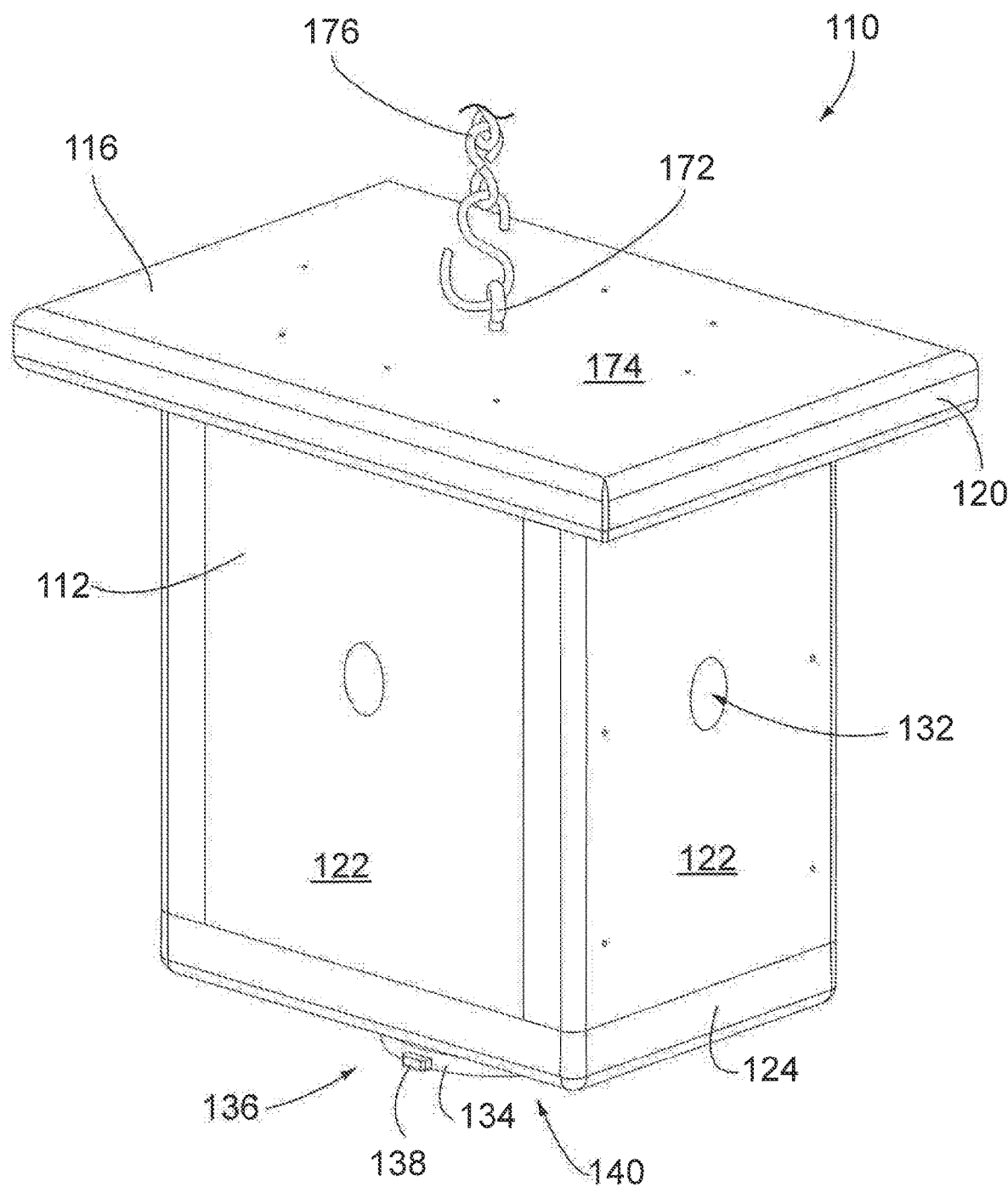
FIG. 5 is a perspective view of a carpenter bee trap, according to another embodiment of the invention.
Figure 6:
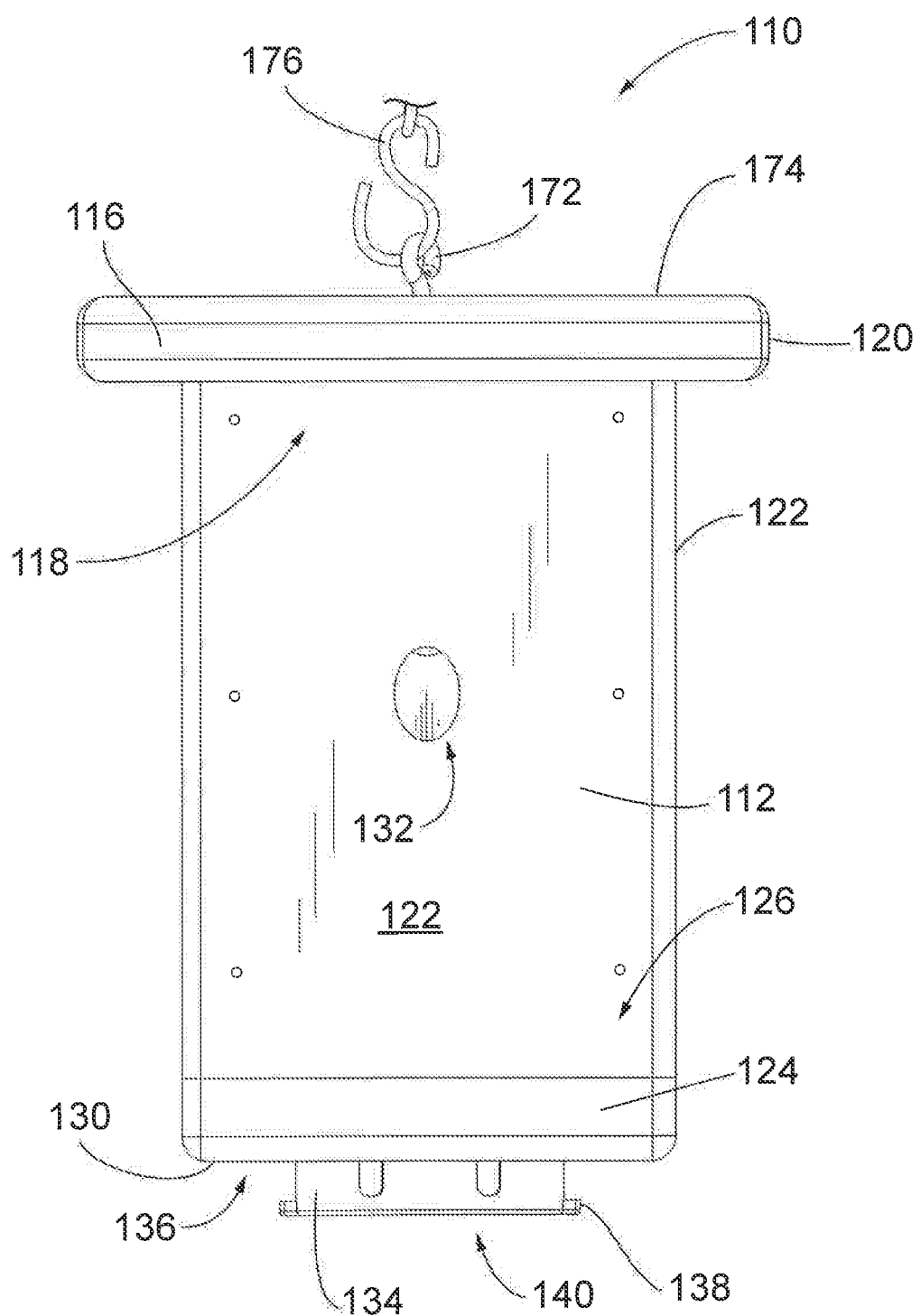
FIG. 6 is a side view of the carpenter bee trap of FIG. 5.
Figure 7:
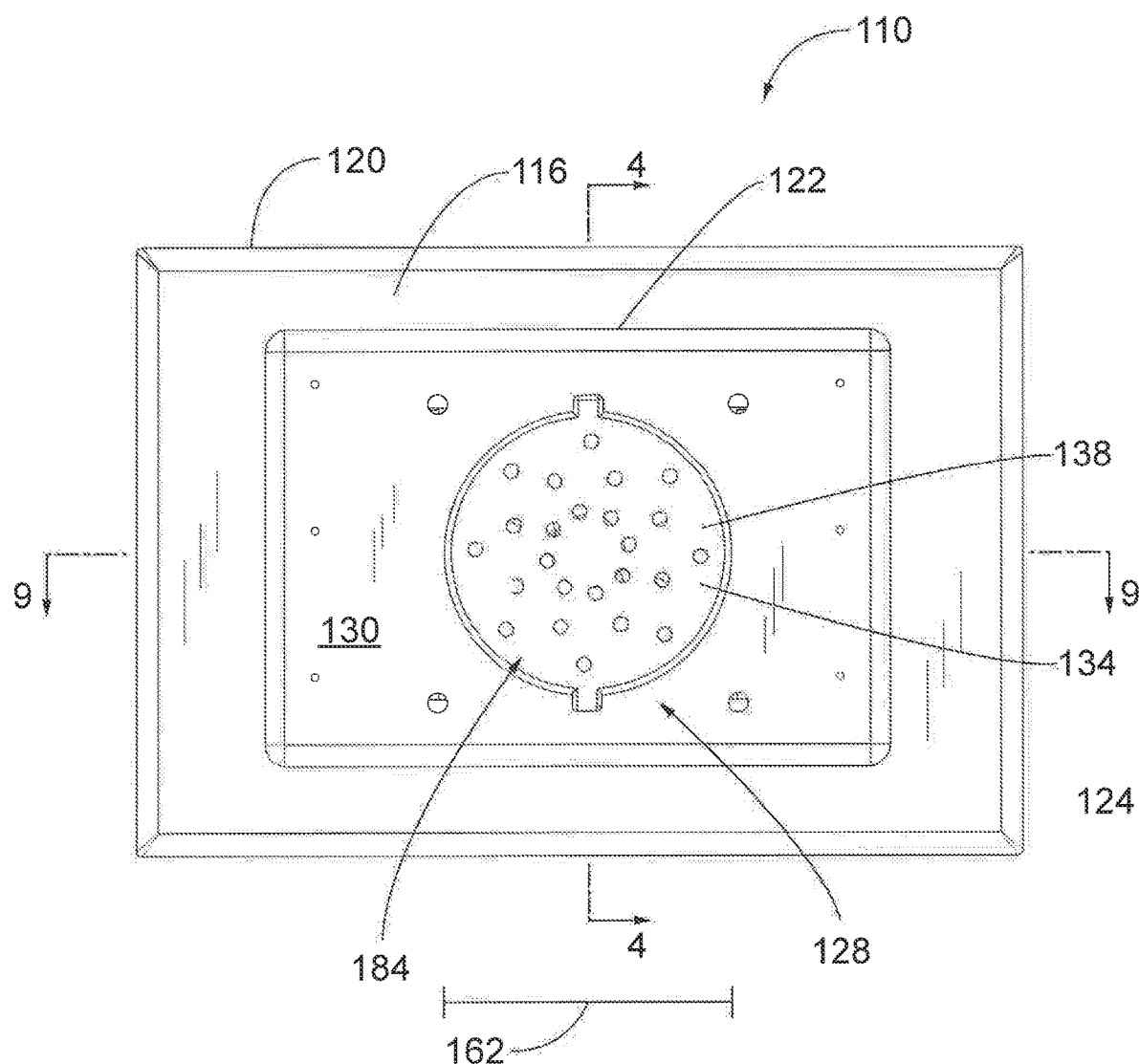
FIG. 7 is a bottom view of the carpenter bee trap of FIG. 5.

Next, FIGS. 5-7 depict perspective, side, and bottom views, respectively, of a carpenter bee trap 110, according to another embodiment of the invention. Similar to the trap 10 described above, trap 110 includes a plurality of sidewalls 112 that surround a trap cavity 114. In varying embodiments of the invention, any number of sidewalls 112 may be used. That is, it is contemplated that the trap 112 may more or less than four (4) sidewalls 12, in other embodiments of the invention. In addition, the trap 110 may vary in shape, and is not limited to the rectangular shape shown in FIGS. 5-7.

The trap 110 may also include a top wall 116 coupled to the top 118 of the sidewalls 112. The top wall 116 assists in further enclosing the trap cavity 114. In the representative embodiment of the invention, edges 120 of the top wall 116 extend beyond the sidewalls 112. However, in varying embodiments of the invention, each edge 120 of the top wall 116 may independently align with the outer surface 122 of a respective sidewall 112 or extend beyond the respective sidewall 112.

The trap 110 may also include a bottom wall 124 coupled to the bottom 126 of the sidewalls 112. The bottom wall 124 even further encloses the cavity 114. As shown in FIG. 7, the bottom wall 124 may include an opening 128 formed therethrough. While the opening 128 is illustrated as being centrally located on the bottom surface 130 of the bottom wall 124, it is contemplated that the opening 128 may be located at any location on the bottom surface 130 of the bottom wall 124. Opening 128 operates as an exit for the trap cavity 114.

At least one opening 132 is formed through at least one of the sidewalls 112 to act as an entrance to the trap 10. That is, each sidewall 112 may include any number of openings 132, including zero. The openings 132 are configured to operate as entrances into the cavity 114 for the carpenter bees. The configuration of the openings 132 will be further described below with respect to FIG. 8.

FIG. 5 illustrates the sidewalls 114 as being oriented perpendicular to the top wall 116 and perpendicular to the bottom wall 124. However, the sidewalls 114 may be independently oriented at any angle with respect to the top wall 116 and the bottom wall 124.

The trap 110 also includes a container 134 disposed at the bottom 136 of the trap 110. The container 134 extends from within the cavity 114, through the opening 128, and out into the external environment. In this representative embodiment of the invention, the container 134 is removable from the exit opening 128, which allows a user to empty the trap 110.

Figure 8:
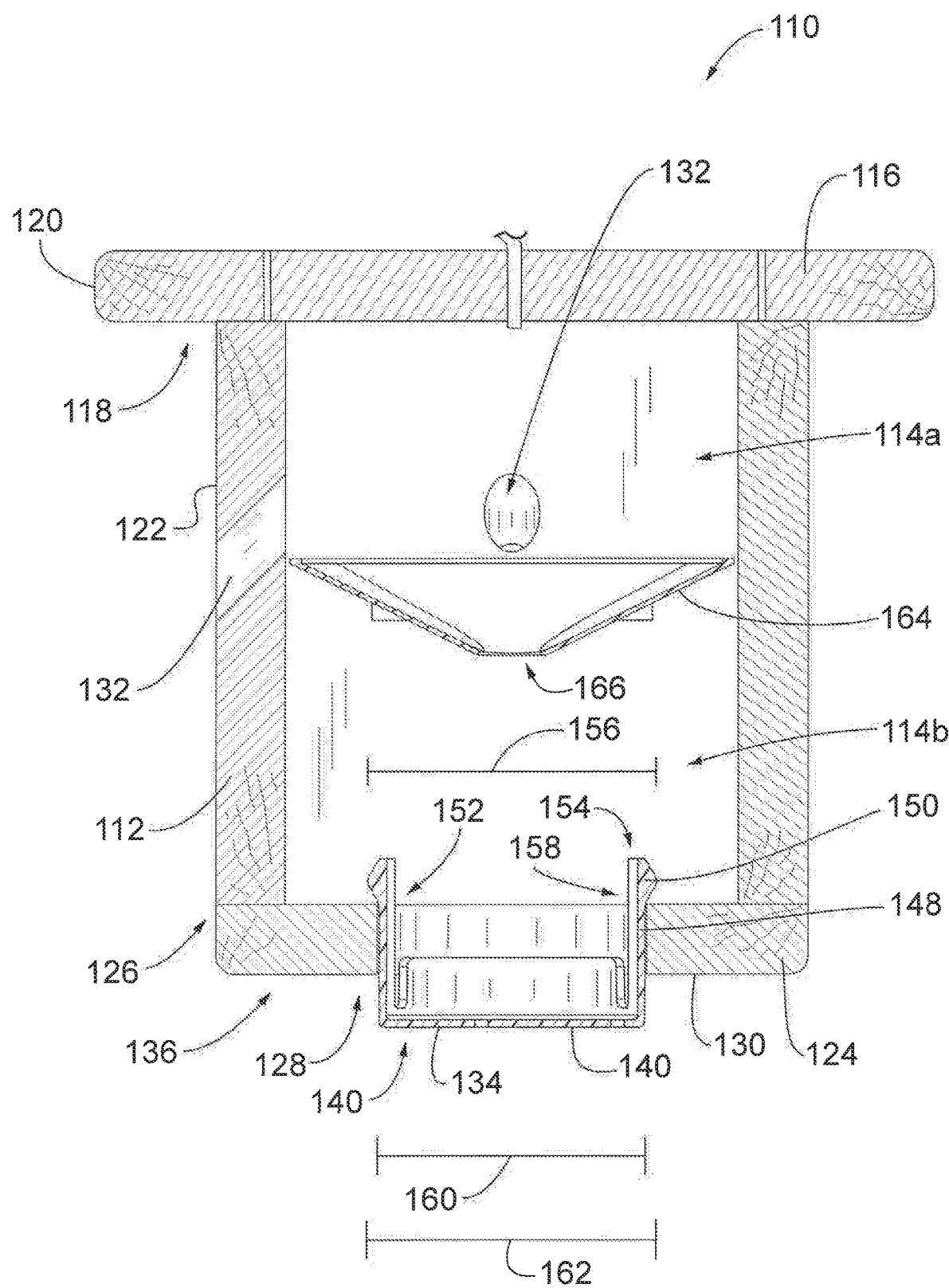
FIG. 8 is a cross-sectional view of the carpenter bee trap of FIG. 7, taken along line 8-8.
Figure 9:
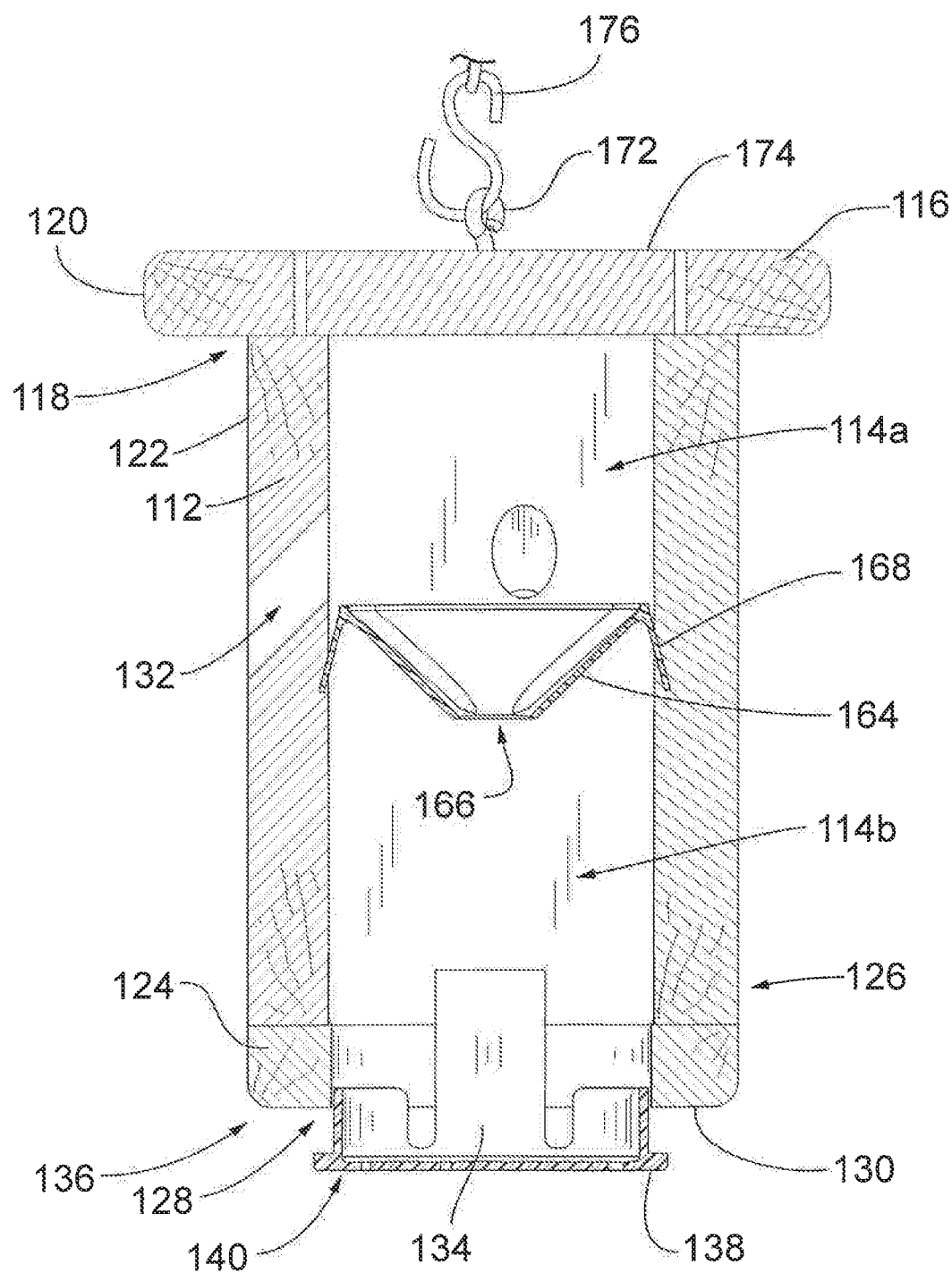
FIG. 9 is a cross-sectional view of the carpenter bee trap of FIG. 7, taken along line 9-9.

Next, FIGS. 8 and 9 depict cross-sectional views of the trap 110 to better show the cavity 114, the container 134 within the cavity 114, and a funnel 164 disposed within the cavity 114. As shown, the funnel 164 is suspended within the cavity 114 and separates the cavity 114 into an upper cavity 114*a* and a lower cavity 114*b*.

Referring to FIG. 8, the container 134 is illustrated as having a main body 148, a bottom wall 138 disposed at the bottom 140 of the container 134, and a flanged portion 150 extending from the top 152 of the main body 148. In the representative embodiment of the invention, the container 134 and its walls thicken to increase the outer diameter of the container 134. As a result, the flanged portion 150 has a larger diameter 156 than a diameter 160 of the main body 148 of the container.

In addition, the diameter 156 of the flanged portion 150 is larger than the exit opening 128 formed in the bottom wall 124 of the trap 110. As a result of the above, the container 134 is able to maintain its position within the flanged portion 150 disposed in the cavity 114, the main body 148 extending through the exit opening 128, and the main body 148 extending beyond and away from the bottom 136 of the trap 110 without the assistance of a coupling means.

FIG. 9 depicts the interaction between the funnel 164 and an inner surface 170 of the sidewalls 112. The funnel 164 includes a plurality of flanges 168 extending outwardly from the funnel 164. The flanges 168 are oriented to push against the inner surface 170 of a respective sidewall 112 in order to maintain the funnel 164 in a suspended position within the cavity 114. The funnel 164 acts to direct the bees from the upper cavity 114a to the lower cavity 114b. Once the bees enter to the lower cavity 114b of the trap 110, they are unable to escape from the trap 110 until the container 134 is removed by a user.

While the representative embodiment of the invention illustrates the funnel 164 including two (2) flanges 168, it is contemplated that the funnel 164 may include any number of flange 168 more or less than two (2), in other embodiments of the invention.

FIGS. 8 and 9 also depict the orientation of the openings 132 in the sidewalls 112. For example, the openings 132 in the sidewalls 112 are oriented at an upward angle. However, in other embodiments of the invention, the openings 132 may be oriented at any angle.

Referring again to FIGS. 5 and 6, a mounting element 172 is coupled to a top surface 174 of the top wall 116. In the representative embodiment of the invention, the mounting element 712 is a mounting hook screwed into the top wall 116 of the trap 110. In other embodiments of the invention, the mounting element 172 may be other mounting means coupled to the top wall 116 of the trap 110. A chain or rope 176 is then coupled to the mounting element 172 in order to suspend the trap 110 from a mounting location, such as, but not limited to a rafter.

Figure 10:
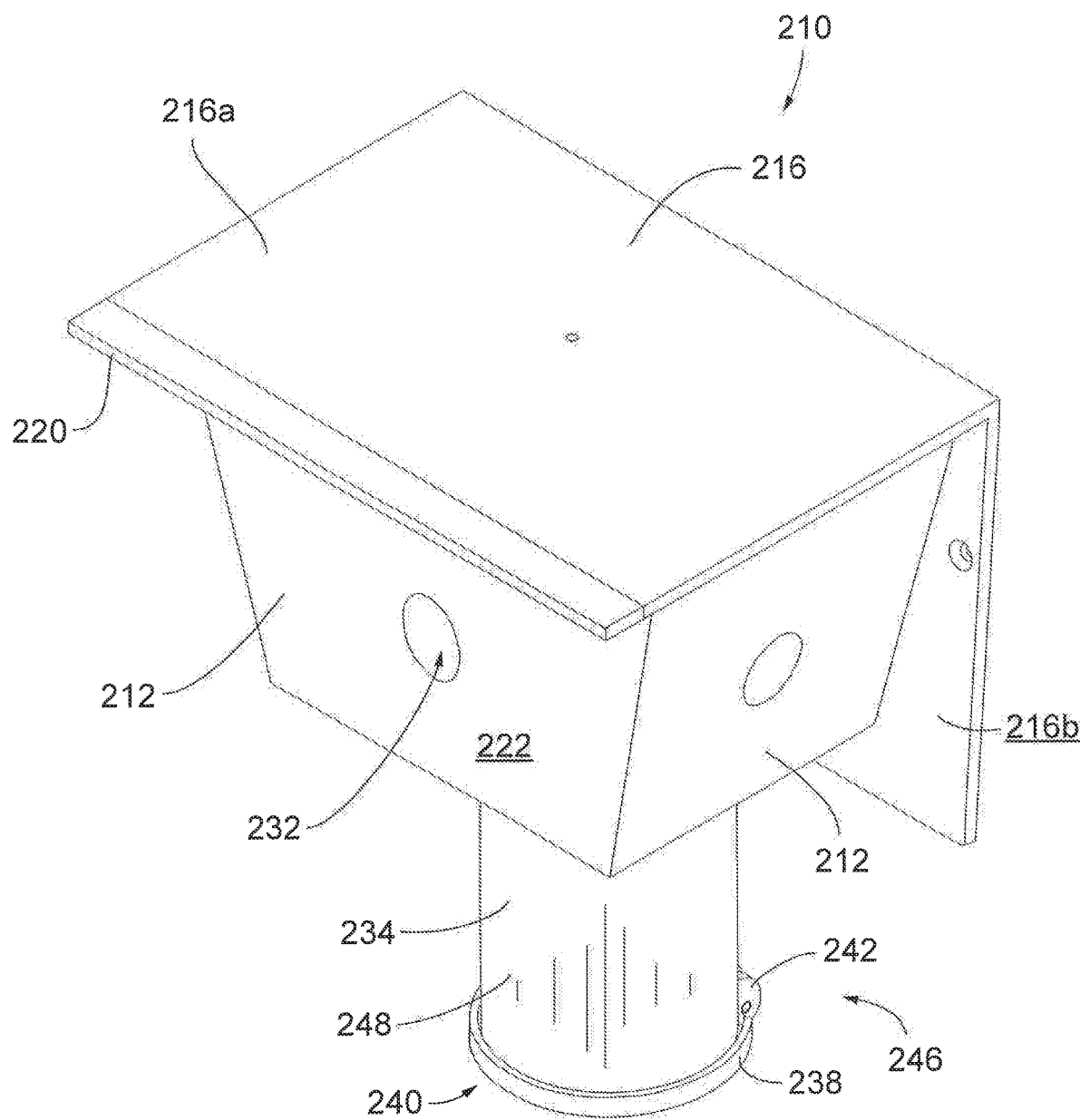
FIG. 10 is a perspective view of a carpenter bee trap, according to yet another embodiment of the invention.
Figure 11:
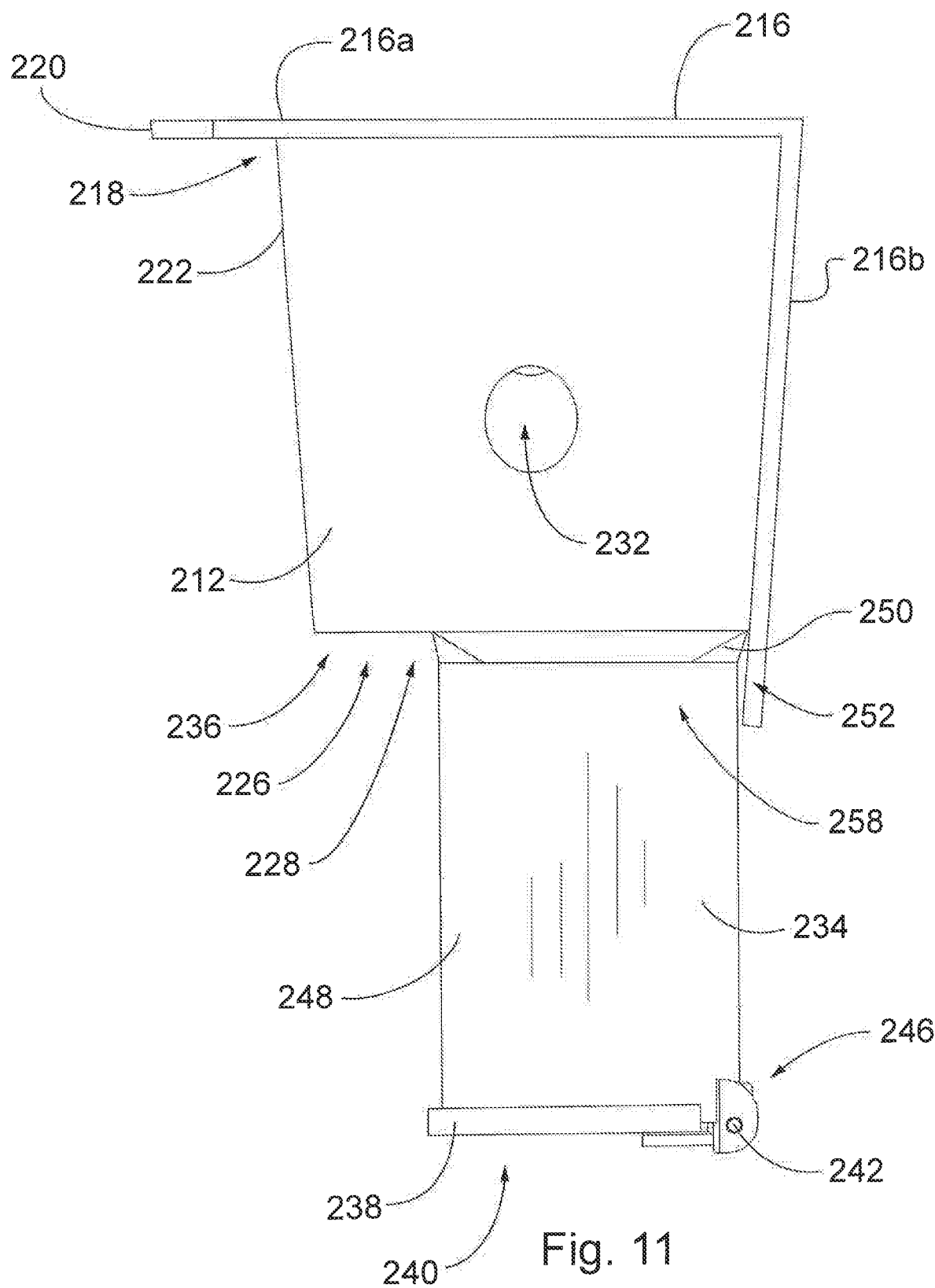
FIG. 11 is a side view of the carpenter bee trap of FIG. 10.
Figure 12:
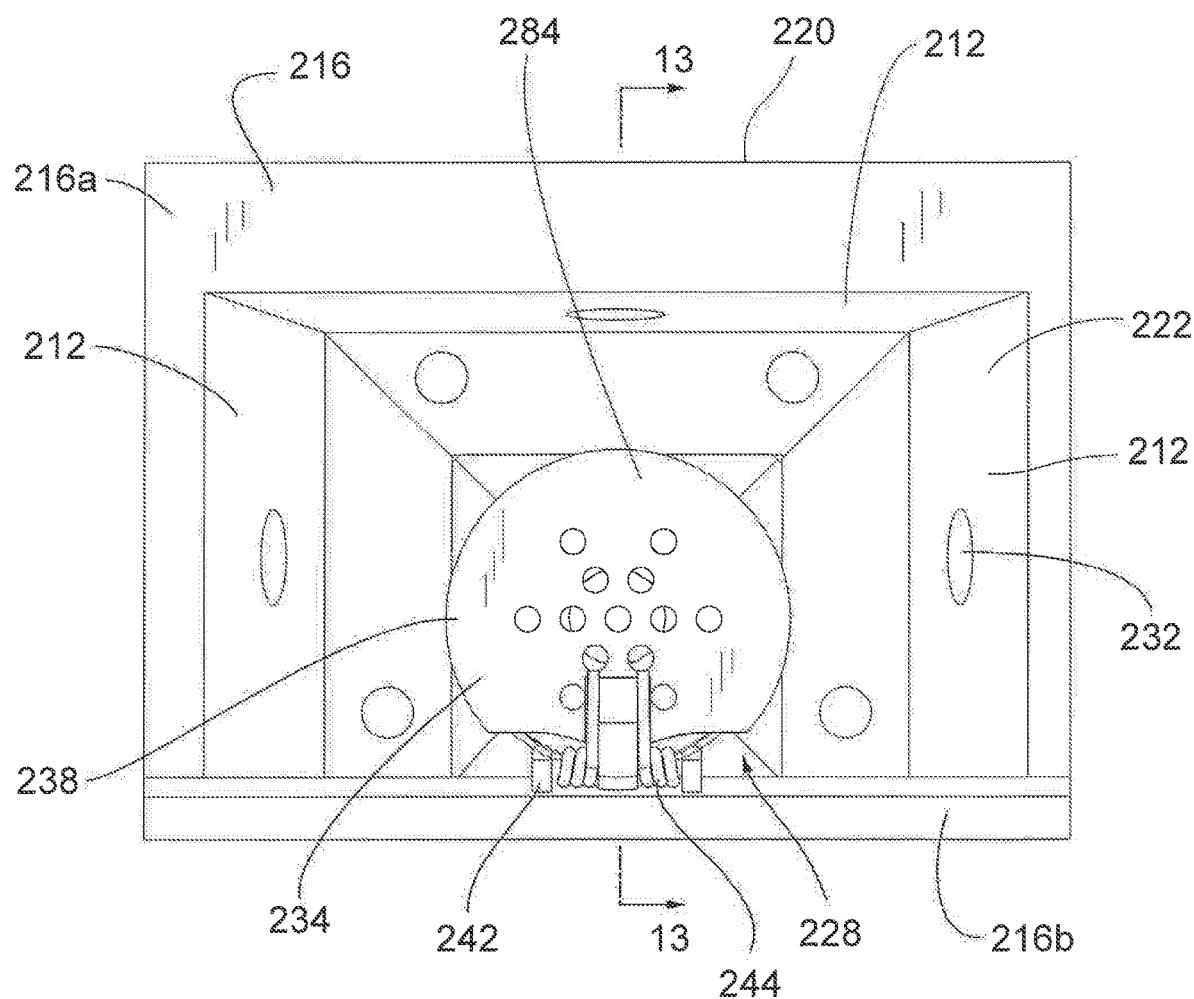
FIG. 12 is a bottom view of the carpenter bee trap of FIG. 10.

Referring next to FIGS. 10-12, perspective, side, and bottom views, respectively, are shown of a carpenter bee trap 210, according to another embodiment of the invention. The trap 210 has a trap cavity 214 surrounded by a plurality of sidewalls 212. The trap 210 further includes a top hood 216. The top hood 216 includes a first portion 216a and a second portion 216b. The first portion 216a of the top hood 216 is a top wall 216a of the trap 210 and is coupled to the top 218 of the sidewalls 212. Meanwhile, the second portion 216b of the top hood provides an additional sidewall 216b.

In the representative embodiment of the invention, there are three (3) sidewalls 212 and one (1) sidewall 216b formed by the second portion 216b of the hood 216. In other embodiments of the invention, the trap 210 may include more or less than three (3) sidewalls 212 and the second portion 216b of the hood 216 may form any number of additional sidewalls 216b. It is further contemplated that alternative embodiments of the trap 210 may be in a variety of shapes, not just the rectangular shape shown in FIG. 10.

In addition, while FIG. 10 shows a number of the edges 220 of the top wall 216a extending beyond the plurality of sidewalls 12, it is contemplated that each edge 220 of the top wall 216a may either align the outer surface 222 of a respective sidewall 212 or extend beyond the respective sidewall 212.

In this representative embodiment of the invention, the bottom 226 of the plurality of walls 212 surrounded an opening 228 at the bottom 236 of the trap 210. Opening 228 operates as an exit of the trap cavity 214. In addition, the plurality of sidewalls 212 may include at least one opening 232 is formed through at least one of the plurality of sidewalls 212 to act as an entrance to the trap 10. It is contemplated that the carpenter bees will enter the trap 210 through these openings 32. While the representative embodiment of the invention depicts an opening 232 in each sidewall 212, it is contemplated that any number of openings 232 may be formed through any number of sidewalls 212. For example, each sidewall 212 may individually include any number of openings 232, including no openings 232. In addition, sidewalls 216b may or may not include any number of openings 232. The configuration of the openings 232 will be further described below with respect to FIG. 12.

While FIG. 10 illustrates the each of the sidewalls 214 as extending from the top wall 216a at an angle, it is contemplated that the sidewalls 214 may be oriented perpendicular to the top wall 216a, in other embodiments of the invention. Further, the angle of each sidewall 14 is independent of the angle of the other sidewalls 14. In addition, while the sidewall 216b is depicted as being oriented perpendicular to the top wall 216a, it is further contemplated that the sidewall 216b may extend from the top wall 216a at an angle other than perpendicular.

A container 234 extends from within the cavity 214, through the opening 228 at the bottom 236 of the trap 210, and out into the external environment. Once the bees enter the trap 210 through the openings 232 described above, the bees transition to the container 234 and become caught in the container 234, where they can collect. As shown in FIGS. 10 and 11, the container 234 includes a door 238 disposed at the bottom 240 of the container 234. A hinge 242 rotatably couples the door 238 to the bottom 240 of the container 234. In the representative embodiment of the invention, the hinge 242 includes a biasing element 244 that maintains the door 238 in a closed position 246. The closed position 246 is depicted in FIGS. 10 and 11. A user may manipulate the door 238 from the closed position 246 to an open position (not shown). In the closed position 246, the bees may collect within the container 234. In the open position, the bees are emptied from the container 234 by gravity. In embodiments of the invention including the biasing element 244, the door 238 automatically transitions from the open position to the closed position 246 when the user releases the door 238.

In alternative embodiments of the invention, the hinge 242 may not include a biasing element 244. In these embodiments of the invention, a retaining device, such as, but not limited to a clip, may be used to retain the door 238 in the closed position 246. For example, a user would be able to release the door 238 from the retaining device, open the door 238 to empty the trap 210, close the door 238, and retain the door 238 in the closed position 246 with the retaining device.

Figure 13:
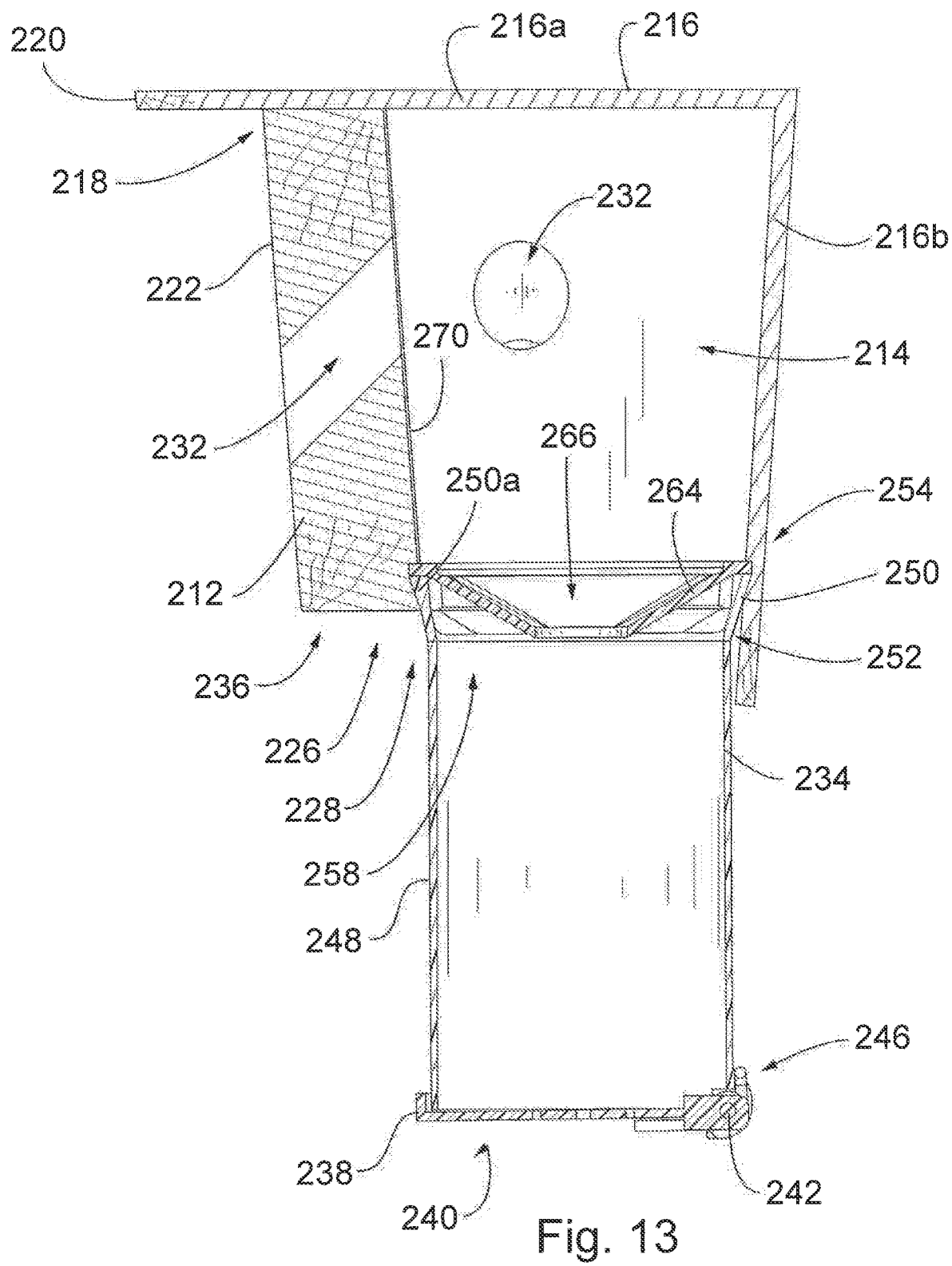
FIG. 13 is a cross-sectional view of the carpenter bee trap of FIG. 12, taken along line 13-13.

Next, FIG. 13 depicts a cross-sectional view of the trap 210 to further illustrate the cavity 214 of the trap 210 and the container 234 extending from within the cavity 214, through the opening 228 at the bottom 236 of the trap 210, and out into the external environment. As shown in FIGS. 10-13, the container 234 includes a main body 248 that is cylindrical in shape. In other embodiments of the invention, the main body 248 may be any other shape other than that of a cylinder. It is the main body 248 of the container 234 that extends through the opening 228 and into the external environment.

The container 234 further includes a flanged portion 250 that extends from the top 252 of the main body 248 of the container 234 at an angle between 0 and 90 degrees. As a result of the flanged portion 250 extending upward and outward from the top 252 of the main body 248, the width of the funnel portion 250 increases from the bottom 258 to the top 254 of the funnel portion 250. As a result, the top 254 of the funnel portion 250 is sized larger than the bottom 258 of the funnel portion 250.

As shown in FIG. 13, the flanged portion 250 extends along an inner surface 270 of the sidewalls 212 of the trap 210. Further, each wall 250a of the flanged portion 250 extends along the inner surface 270 of a respective sidewall 212 at the same angle as the respective sidewall 212. That is, the shape of the flanged portion 250 matches the shape of the trap cavity 214. As a result, the flanged portion 250 of the container 234 is suspended within the cavity 214 without the assistance of a coupling device or material. The flanged portion 250 further extends through the opening 228 and the main body 248 extends into the external environment.

In alternative embodiments of the invention, the flanged portion 250 may include a biasing feature that applies a force to the inner surface 270 of at least one sidewall 212 to assist in suspending the flanged portion 250 of the container 250 within the cavity 214 without the assistance of a coupling device or material.

In addition, the container 234 includes a funnel 264 within the flanged portion 150 to direct the carpenter bees to the main body 248 of the container 234. The funnel 264 extends from the top 254 of the flanged portion 250 to a container opening 266 at the bottom 258 of the flanged portion 50, which is aligned with the top 252 of the main body 248. As shown in FIG. 13, the funnel 264 extends from the top 254 of the flanged portion 250 at an angle between 0 and 90 degrees in order to properly direct the bees to the main body 248 of the container 234.

FIG. 13 also depicts the orientation of the openings 232 in the sidewalls 212. In the representative embodiment of the invention, the openings 232 in the sidewalls 212 are oriented at an upward angle. In other embodiments of the invention, the openings 232 may be oriented at any angle.

Next, FIG. 14 depicts a perspective view of a carpenter bee trap 310, according to another embodiment of the invention. The construction of trap 310 is much the same as trap 210 described above. In this representative embodiment of the invention, the door 338 includes an orifice 372 protruding from a rim 374 of the door 338. The orifice 372 is configured to receive material, such as, but not limited to a string 376. The string 376 is able to be threaded through the orifice 372 and secured so as to hang from the door 338 of the trap 310. The string 376 provides a pulling device for a user to manipulate the door 338 from the closed position 346 to the open position. As a result of the pulling device 376 shown in FIG. 14, a user does not need to climb up to the trap 310 in order to open the door 338. The string 376 can be of any length that would allow the user to open the trap 310 from a comfortable position, such as, but not limited to the standing on the ground.

In varying embodiments of the traps 10, 210, 310 described above, each of the doors 84, 284, 384, respectively, may include a plurality of perforations 84, 284, 384, respectively. The perforations 84, 284, 384, allow airflow between the inside of the container 34, 234, 334 and the external environment. In varying embodiments of the trap 110 described above, the bottom wall 138 may include a plurality of perforations 184 that allow airflow between the inside of the container 134 and the external environment. One benefit of allowing airflow, is that the scent and sound associated with the carpenter bees within the container can act as an attractant for more carpenter bees.

While the embodiments described above and shown in FIGS. 1-12 illustrate their respective containers 34, 134, 234, 334 as being oriented vertically and extending from the bottom of the trap, it is also contemplated that the containers 34, 134, 234, 334 may be oriented horizontally. In such embodiments of the invention, the exit opening 28, 128, 228, 328 through which the container 34, 134, 234, 334 extends through would be formed through one of the sidewalls 12, 112, 212, 312 of the trap.

It is specifically intended that the present invention not be limited to the embodiments and illustrations contained herein, but includes modified forms of those embodiments including portions of the embodiments and combinations of elements of different embodiments as come within the scope of the following claims.

What is claimed:

1. A carpenter bee trap comprising:
   a plurality of walls surrounding a trap cavity;
   at least one entrance opening formed through at least one of the plurality of walls;
   a bottom wall coupled to a bottom of the plurality of walls;
   an exit opening formed through the bottom wall;
   a container disposed within the trap cavity and extending through the exit opening and beyond a bottom of the trap; and
   a funnel disposed within the cavity to direct carpenter bees into the container.

2. The carpenter bee trap of claim I further comprising a door rotatably connected to the bottom of the container by way of a hinge, the door being operable between a closed position and an open position.

3. The carpenter bee trap of claim 2 wherein the hinge includes a biasing element to bias the door to a dosed position.

4. The carpenter bee trap of claim 2 wherein the door includes a plurality of perforations to allow airflow between the container and an external environment.

5. The carpenter bee trap of claim 1 wherein the container includes a main body and a flanged portion extending upward from a top of the main body at an angle between 0 and 90 degrees.

6. The carpenter bee trap of claim 5 wherein the flanged portion has an increasing diameter as it extends from the top of the main body;
   wherein the flanged portion is disposed with the cavity; and
   wherein the main body is disposed within the exit opening and extends away from and beyond the bottom of the trap.

7. The carpenter bee trap of claim 5 wherein the funnel extends from a top of the flanged portion to an opening aligned with the top of the main body.

8. The carpenter bee trap of claim 1 wherein the funnel includes flanges configured to push against an inner surface of at least one sidewall to suspend the funnel within the cavity.

9. A carpenter bee trap comprising:
   a plurality of walls surrounding a trap cavity;
   at least one entrance opening formed through at least one of the plurality of walls;
   an exit opening formed at a bottom of the trap;
   a container disposed within the trap cavity and extending through the exit opening and beyond the bottom of the trap, the container including a main portion and a flanged portion; and
   a door rotatably coupled to a bottom of the container by way of a hinge.

10. The carpenter bee trap of claim 9 wherein the flanged portion extends from a top of the main portion at an angle to increase a width of the flanged portion beyond a width of the exit opening.

11. The carpenter bee trap of claim 10 wherein the flanged portion extends along an inner surface of at least one wall at an angle equal to an angle of the at least one wall.

12. The carpenter bee trap of claim 10 wherein the flanged portion includes a funnel extending from a top of the flanged portion to a bottom of the flanged portion, the funnel forming a container opening at the bottom of the flanged portion.

13. The carpenter bee trap of claim 9 wherein the hinge includes a biasing element to bias the door to a closed position.

14. The carpenter bee trap of claim 9 wherein the door includes a plurality of perforations to allow airflow between the container and an external environment.

15. The carpenter bee trap of claim 9 further including a pulling device coupled to the door, the pulling device allowing a user to transition the door from a closed position to an open position from a distance.

16. A carpenter bee trap comprising:
a plurality of sidewalls surrounding a trap cavity;
at least one entrance opening formed through at least one of the plurality of sidewalls;
a bottom wall coupled to the bottom of the plurality of sidewalls;
an exit opening formed through the bottom wall;
a funnel suspended within the trap cavity, the funnel separating the trap cavity into an upper trap cavity and a lower trap cavity; and
a container disposed within the lower trap cavity and extending through the exit opening and away from the bottom wall of the carpenter bee trap.

17. The carpenter bee trap of claim 16 wherein the container includes a main body, a flanged portion extending from a top of the main body, and a bottom wall coupled to a bottom of the main body; and
wherein the flanged portion is disposed within the lower trap cavity and the main body extends through the exit opening and beyond the bottom wall of the carpenter bee trap.

18. The carpenter bee trap of claim 17 wherein the flanged portion has a first outer diameter and the main body has a second outer diameter; and
wherein the first outer diameter is greater than the second outer diameter.

19. The carpenter bee trap of claim 18 wherein the first outer diameter of the flanged portion is greater than a diameter of the exit opening.

20. The carpenter bee trap of claim 16 wherein the funnel includes at least one flange configured to push against an inner surface of at least one sidewall to suspend the funnel within the cavity.

* * * * *